(12) United States Patent
Winther-Jensen et al.

(10) Patent No.: US 10,087,536 B2
(45) Date of Patent: Oct. 2, 2018

(54) BREATHABLE ELECTRODE AND METHOD FOR USE IN WATER SPLITTING

(75) Inventors: Bjorn Winther-Jensen, Mount Waverley (AU); Douglas MacFarlane, East Brighton (AU); Orawan Winther-Jensen, Mount Waverley (AU)

(73) Assignee: AQUAHYDREX PTY LTD, North Wollongong, New South Wales (AU)

( * ) Notice: Subject to any disclaimer, the term of this patent is extended or adjusted under 35 U.S.C. 154(b) by 706 days.

(21) Appl. No.: 14/406,797

(22) PCT Filed: Jun. 12, 2012

(86) PCT No.: PCT/AU2012/000668
§ 371 (c)(1),
(2), (4) Date: Mar. 2, 2015

(87) PCT Pub. No.: WO2013/185163
PCT Pub. Date: Dec. 19, 2013

(65) Prior Publication Data
US 2015/0167185 A1    Jun. 18, 2015

(51) Int. Cl.
| C25B 11/03 | (2006.01) |
| C25B 1/06 | (2006.01) |
| C25B 1/10 | (2006.01) |
| C25B 9/08 | (2006.01) |
| C25B 9/10 | (2006.01) |

(Continued)

(52) U.S. Cl.
CPC ............ *C25B 11/035* (2013.01); *C25B 1/04* (2013.01); *C25B 1/06* (2013.01); *C25B 1/10* (2013.01); *C25B 9/08* (2013.01); *C25B 9/10* (2013.01); *C25B 11/0442* (2013.01); *C25B 11/0489* (2013.01); *Y02E 60/366* (2013.01)

(58) Field of Classification Search
CPC .... C25B 1/06; C25B 1/10; C25B 9/08; C25B 9/10; C25B 11/035; H01M 4/8605
See application file for complete search history.

(56) References Cited

U.S. PATENT DOCUMENTS

| 3,410,770 A | 11/1968 | Buechler |
| 4,042,481 A | 8/1977 | Kelly |
| 4,086,155 A | 4/1978 | Jonville |

(Continued)

FOREIGN PATENT DOCUMENTS

| JP | WO 2012023535 A1 * | 2/2012 | ............... C25B 1/04 |
| JP | 2012041578 A | 3/2012 | |

(Continued)

OTHER PUBLICATIONS

Winther-Jensen et al., Towards hydrogen production using a breathable electrode structure to directly separate gases in the water splitting reaction, Elsevier Ltd., International Journal of Hydrogen Energy 37 (2012), pp. 8185-8189.

(Continued)

*Primary Examiner* — Nicholas A Smith
(74) *Attorney, Agent, or Firm* — Haynes and Boone, LLP

(57) ABSTRACT

The present invention relates to a water splitting cell having at least one electrode comprising a porous membrane, wherein gas produced at the electrode diffuses out of the cell via the porous membrane, separating the gas from the reaction at the electrode without bubble formation.

22 Claims, 5 Drawing Sheets

(51) Int. Cl.
*C25B 1/04* (2006.01)
*C25B 11/04* (2006.01)

(56) References Cited

U.S. PATENT DOCUMENTS

| | | | |
|---|---|---|---|
| 4,720,331 | A | 1/1988 | Billings |
| 5,395,501 | A | 3/1995 | Rohrbacker et al. |
| 7,651,602 | B2 | 1/2010 | Helmke et al. |
| 2004/0040838 | A1 | 3/2004 | Helmke et al. |
| 2005/0126924 | A1 | 6/2005 | Gomez |
| 2007/0080069 | A1 | 4/2007 | Melosi |
| 2011/0311903 | A1* | 12/2011 | Bulan .............. C25B 11/035 429/524 |
| 2013/0313126 | A1 | 11/2013 | Raatschen et al. |

FOREIGN PATENT DOCUMENTS

| WO | WO 00/34184 | 6/2000 |
|---|---|---|
| WO | WO 01/85636 | 11/2001 |
| WO | WO2013/185163 | 12/2013 |

OTHER PUBLICATIONS

Marini et al., Advanced alkaline water electrolysis, Elsevier Ltd. (2012), pp. 384-391.

Chaparro et al., Study of electrochemical instabilities of PEMFC electrodes in aqueous solution by means of membrane inlet mass spectrometry, Journal of Electroanalytical Chemistry 591 (2006), pp. 69-73.

Ioroi et al., Influence of PTFE coating on gas diffusion backing for unitized regenerative polymer electrolyte fuel cells, Journal of Power Sources 124 (2003), pp. 385-389.

Jang et al., Effect of water electrolysis catalysts on carbon corrosion in polymer electrolyte membrane fuel cells, J. Am. Chem. Soc. (2010), 132, 14700-701.

Jiang et al., A planar microfabricated electrolyzer for hydrogen and oxygen generation, Journal of Power Sources 188 (2009), pp. 256-260.

Kato et al., Highly efficient water splitting into $H_2$ and $O_2$ over lanthanum-doped $NaTaO_3$ photocatalysts with high crystallinity and surface nanostructure, J. Am. Chem. Soc. (2003), 125, 3082-3089.

Kudo et al., Heterogeneous photocatalyst materials for water splitting, Chem. Soc. Rev., 2009, 38, pp. 253-278.

Marangio et al., Concept of a high pressure PEM electrolyser prototype, International Journal of Hydrogen Energy 36 (2011), pp. 7807-7815.

Mohapatra et al., Design of a highly efficient photoelectric cell for hydrogen generation by water splitting: application of $TiO_{2-x}C_x$ nanotubes as a photoanode and $Pt/TiO_2$ nanotubes as a cathode, J. Phys. Chem. C2007, 111, pp. 8677-8685.

Nieminen et al., Comparative performance analysis of PEM and solid oxide steam electrolysers, International Journal of Hydrogen Energy 35 (2010), pp. 10842-10850.

Osterloh, Inorganic materials as catalysts for photochemical splitting of water, Chem. Mater. 2008, 20, pp. 35-54.

Pletcher et al., Prospects for alkaline zero gap water electrolysers for hydrogen production, International Journal of Hydrogen Energy 36 (2011), pp. 15089-15104.

Tributsch, Photovoltaic hydrogen generation, International Journal of Hydrogen Energy 33 (2008), pp. 5911-5930.

Winther-Jensen et al., High rates of oxygen reduction over a vapor phase-polymerized PEDOT electrode, Science 321, Aug. 2008, pp. 671-674.

Yin et al., Enhanced solar water-splitting efficiency using core/sheath heterostructure $CdS/TiO_2$ nanotube arrays, Nanotechnology 18 (2007) 495608, pp. 1-6.

Zeng et al., Recent progress in alkaline water electrolysis for hydrogen production and applications, Progress in Energy and Combustion Science 36 (2010, pp. 307-326.

International Search Report and Written Opinion of the ISA/AU for PCT/AU2012/000668 dated Jul. 17, 2012, 11pages.

USPTO, Non-Final Office Action dated Mar. 23, 2017 in U.S. Appl. No. 14/407,014, 9 pages.

USPTO, Final Office Action dated Aug. 17, 2017 in U.S. Appl. No. 14/407,014, 9 pages.

\* cited by examiner

BREATHABLE ELECTRODE AND METHOD FOR USE IN WATER SPLITTING

CROSS-REFERENCE TO RELATED APPLICATION

This application is a United States national phase of co-pending international patent application No. PCT/AU2012/000668, filed Jun. 12, 2012, the entire disclosure of which is hereby incorporated herein by reference.

FIELD OF INVENTION

The present invention relates to the field of electrochemistry, particularly electrodes and electrolytic reactions.

In one form, the invention relates to a novel electrode.

In one particular aspect the present invention is suitable for use in water splitting processes.

In another particular aspect the present invention there is provided a method for directly separating gases in an electrolytic reaction such as water splitting.

In another aspect of the present invention there is provided a water splitting device.

It will be convenient to hereinafter describe the invention in relation to water splitting, however it should be appreciated that the present invention is not limited to that use only.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

The overall reaction of water splitting, $2H_2O \rightarrow 2H_2+O_2$, produces $O_2$ and $H_2$ gases as end products. These gases need to be kept separate for later individual use and to avoid production of an explosive gas mixture (Tributsch H. Photovoltaic hydrogen generation *Int J Hydrogen Energy* 2008; 33:5911-30). There are several approaches to the design of devices that can maintain separation of the two gases during electrolysis, for example the use of a membrane to separate the electrode compartments. This also minimizes cross-over of dissolved gases from one electrode to be recycled at other electrode (Ioroi T, Oku T, Yasuda K, Kumagai N, Miyazaki Y. Influence of PTFE coating on gas diffusion backing for unitized regenerative polymer electrolyte fuel cells. *J Power Sources* 2003; 124:385-9; and Marangio F, Pagani M, Sentarelli M, Cali M, Concept of a high pressure PEM electrolyser prototype. *Int J Hydrogen Energy* 2011; 36:7807-15.

Although the gases can be separated, new issues arise with these technologies e.g. cost, mechanical properties, high resistance through the membrane and ultra pure water is needed for proper operation (Nieminen J, Dincer I, Naterer G. Comparative performance analysis of PEM and solid oxide steam electrolysers. *Int J Hydrogen Energy* 2010; 35:10842-50). Alkaline zero gap electrolysers using $OH^-$ conducting membranes are also being considered (Pletcher D, Li X. Prospects for alkaline zero gap water electrolysers for hydrogen production. *Int J Hydrogen Energy* 2011; 36:15089-104).

In the traditional alkaline electrolyser, where a diaphragm is the only separator, bubble formation inside and between the electrode and the separator is the major cause of transport resistance. A number of suggestions on bubble management have been made e.g. use of mechanical circulation of the electrolyte, use of (stable) additives to reduce surface tension of the electrolyte so the bubble can leave the system easier and modification of the electrode surface properties to be less attractive to the gas bubbles (Zeng K, Zhang D. Recent progress in alkaline water electrolysis for hydrogen production and applications. *Prog Energy Combust Sci* 2010; 36:307-26.)

One of the features of the $O_2$ evolution reaction is that the dissolved oxygen concentration at the electrode has to build up to a level sufficient to nucleate and form small, high-pressure bubbles. According to Laplace's equation: $P=2\gamma/r$, where P is pressure in the bubble, $\gamma$ is the surface tension and r the radius of the bubble, near the surface of an electrolyte, $O_2$ bubbles with 0.1 μm radius need to have a pressure of 14 atm at 25° C. The concentrations required not only produce overpotential at the electrode (and thus inefficiencies in water splitting), but also represent a very reactive environment that challenges the long term stability of many catalysts.

Several reports have described efforts to improve water splitting cell efficiency by addition of sacrificial agents or co-catalysts, modification of catalyst crystal structures and morphology, and specific surface area (Kudo A, Miseki Y. Heterogeneous photocatalyst materials for water splitting. *Chem Soc. Rev* 2009; 38:253-78; Kato H, Asakura K, Kudo A. Highly efficient water splitting into $H_2$ and $O_2$ over lanthanum-doped $NaTaO_3$ photocatalysts with high crystallinity and surface nanostructure. *J Am Chem Soc* 2003; 125:3082-9; and Osterloh F E. Inorganic materials as catalysts for photochemical splitting of water. Chem Mater 2008; 20:35-54.)

A few reports have designed novel electrode architectures at the nano- or micro-scopic scales to enhance cell performance (Mohapatra S K, Misra M, Mahajan V K, Raja K S. Design of a highly efficient photoelectrolytic cell for hydrogen generation by water splitting: Application of $TiO_2$-xCx nanotubes as a photoanode and $Pt/TiO_2$, nanotubes as a cathode. *J Phys Chem C* 2007; 111:8677-85; and Yin Y, Jin Z, Hou F. Enhanced solar water-splitting efficiency using core/sheath heterostructure $CdS/TiO_2$ nanotube arrays. Nanotechnology 2007; 18).

Also, there have been attempts to separate the gases using different flow streams of the electrolyte in a planar microfabricated device, but the device efficiency was not high (Jiang L, Myer B, Tellefsen K, Pau S. A planar microfabricated electrolyzer for hydrogen and oxygen generation. *J Power Sources* 2009; 188:256-60). It appears that improvements, based on modification of the electrode structure, to rapidly remove the $O_2$ from the cell before the bubble is formed, has not yet been widely considered. The traditional gas diffusion electrodes (GDE) of the type used in fuel cells have a tendency to continue to form $O_2$ bubbles when operating in water splitting devices (Ioroi T, Oku T, Yasuda K, Kumagai N, Miyazaki Y. Influence of PTFE coating on gas diffusion backing for unitized regenerative polymer electrolyte fuel cells. *J Power Sources* 2003; 124:385-9). Moreover, these electrodes are not stable under water oxidation (WO) condition, the carbon being rapidly oxidized at the potentials involved in WO (Chaparro A M, Mueller N, Atienza C, Daza L. Study of electrochemical instabilities of PEMFC electrodes in aqueous solution by means of membrane inlet mass spectrometry. *J Electroanal Chem* 2006; 591:69-73; and Jang S E, Kim H. Effect of water electrolysis catalysts on carbon corrosion in polymer electrolyte membrane fuel cells. *J Am Chem Soc* 2010; 132:14700-1.)

In other prior art work a hydrophobic gas porous membrane (Goretex®) has been used to develop an efficient three phase-interface structure for an air-electrode (Winther-Jensen B, Winther-Jensen O, Forsyth M, MacFarlane D R. High rates of oxygen reduction over a vapour phase-polymerized PEDOT electrode. *Science* 2008; 321:671-4). The advantage of this, as a substrate for an electrode, is that gas can diffuse through the membrane, but liquid water cannot, and that an efficient three-phase interface can be maintained during operation. The fact that the cell responds linearly to the $O_2$ content in the supplied gas in the $O_2$ reduction reaction clearly proved that efficient gas transportation through the electrode was achieved.

SUMMARY OF INVENTION

An object of the present invention is to provide a device, method and process for the use of a hydrophobic membrane for electrolysis to directly separate the evolved gases from the electrolyte solution.

Another object is to improve the efficiency of electrolytic reactions such as water splitting.

A further object of the present invention is to alleviate at least one disadvantage associated with the related art.

It is an object of the embodiments described herein to overcome or alleviate at least one of the above noted drawbacks of related art systems or to at least provide a useful alternative to related art systems.

In a first aspect of embodiments described herein there is provided a water splitting cell having at least one electrode comprising a porous membrane, wherein gas produced at the at least one electrode diffuses out of the cell via the porous membrane.

The removal of produced gas across the porous membrane results in a device capable of separating the gas from the reaction at the electrode. Note that the porous membrane may also be a porous gas permeable membrane, if the appropriate phase interface can be established. Greater than 90% of the gas produced at the at least one electrode can be removed from the cell across the porous membrane. Desirably, and greater than 95% and greater than 99% of the gas produced can be removed across the porous membrane.

The removal of gas from the reaction at the electrode without substantial bubble formation permits the water splitting reaction to be achieved with a substantially lower over potential, thereby increasing the efficiency of the water splitting cell.

By the term "without substantial bubble formation" it will be understood that we mean without substantial formation of bubbles visible to the naked eye. All bubbles are "formed" very small and then grow as this is the preferred state because it lowers the pressure in the bubble (according to Laplace's equation: $P=2\gamma/r$, where P is pressure in the bubble, $\gamma$ is the surface tension and r the radius of the bubble). Small bubbles can easily fuse to form bigger ones, thus leading to a range of bubble sizes. The water splitting cell may be capable of operating without the substantial formation of gas bubbles greater than 125 µm in diameter. In some embodiments, the water splitting cell is capable of operating without the substantial formation of bubbles greater than 100 µm in diameter and without the formation of bubbles greater than 50 µm in diameter. The water splitting cell may, in particular embodiments permit operation without the formation of gas bubbles.

Separating the gas from the active area of the electrode without substantial bubble formation facilitates the efficient operation of the water splitting cell.

In a second aspect of embodiments described herein there is provided a water splitting cell having a cathode comprising a porous membrane, wherein $H_2$ gas produced at the cathode diffuses out of the cell via the porous membrane, separating the $H_2$ gas from the cathodic reaction without bubble formation.

In a third aspect of embodiments described herein there is provided a water splitting cell having an anode comprising a porous membrane, wherein $O_2$ gas produced at the anode diffuses out of the cell via the porous membrane, separating the $O_2$ gas from the anodic reaction without bubble formation.

In a fourth aspect of embodiments described herein there is provided a water splitting cell having:
 a cathode comprising a first porous membrane,
 an anode comprising a second porous membrane,
 at least one electrolyte for immersion of the anode and the cathode,
wherein gas is produced at the electrodes without bubble formation and diffuses out of the cell via the porous membranes.

In a fifth aspect of embodiments described herein there is provided an electrode for water splitting comprising a porous membrane associated with a model catalyst.

In a sixth aspect of embodiments described herein there is provided a water splitting device according to the present invention comprising a porous membrane associated with a model catalyst.

This catalyst may be chosen from known catalysts according to the reaction occurring on the electrode. Generally precious metals such as platinum, gold and palladium can be used. Further, suitable catalysts for water oxidation include: rare elements such as Ru and Ir complexes, Mn complexes which have been studied extensively as models of the oxygen-evolution-catalyst (OEC) but none of them is a pure photo-catalyst, and abundant metals complexes such as Fe, $NiO_x$ and Co (See for example, X. Liu, F. Wang, Transition metal complexes that catalyze oxygen formation from water: 1979-2010, Coordination Chemistry Reviews 256 (2012) 1115-1136; P. Du, R. Eisenberg, Catalysts made of earth-abundant elements (Co, Ni, Fe) for water splitting: Recent progress and future challenges, Energy and Environmental Science 5 (2012) 6012-6021; and M. W. Kanan, D. G. Nocera, In situ formation of an oxygen-evolving catalyst in neutral water containing phosphate, and $Co^{2+}$, Science 321 (2008) 1072-1075.

For increasing stability, such metal-oxide catalysts may be containing an additional element such as phosphorous. For water reduction, conducting polymers such as poly(3, 4-ethylenedioxythiophene) and polypyrrole, Co, Ni, a few Fe complexes and $MoS_x$ have been reported as catalysts for water reduction reaction. (P. Du, R. Eisenberg, Catalysts made of earth-abundant elements (Co, Ni, Fe) for water splitting: Recent progress and future challenges, Energy and Environmental Science 5 (2012) 6012-6021; B. Winther-Jensen, K. Fraser, C. Ong, M. Forsyth, D. R. MacFarlane, Conducting polymer composite materials for hydrogen generation, Advanced Materials 22 (2010) 1727-1730; J. Chen, J. Huang, G. F. Swiegers, C. O. Too, G. G. Wallace, A readily-prepared electrocatalytic coating that is more active than platinum for hydrogen generation in 1 M strong acid, Chemical Communications 10 (2004) 308-309; Y. Hou, B. L. Abrams, P. C. K. Vesborg, M. E. Bjorrketun, K. Herbst, L. Bech, A. M. Setti, C. D. Damsgaard, T. Pedersen, O. Hansen, J. Rossmeisl, S. Dahl, J. K. Norskov, I. Chorkendorff, Bioinspired molecular co-catalysts bonded to a silicon photocathode for solar hydrogen evolution, Nature Materials 10 (2011) 434-438.) The choice of catalyst will depend on operating conditions such as temperature, salinity and pH of the electrolyte.

In another embodiment the catalyst is platinum deposited on the porous membrane.

The cell of the present invention not only separates the gases and decreases gas cross-over in the cell, but also facilitates a more favourable environment for the operation of the catalyst. In general, increasing partial pressure of $O_2$ in an electrolytic cell causes increasing degradation of the catalyst, particularly the anode catalyst. Hence the removal of $O_2$ according to the present invention reduces this effect, permitting the use of (photo) catalysts previously unsuitable such as CdS, CdSe, and GaAs.

In one embodiment, the catalyst is tuned to produce the gas (hydrogen or oxygen) at a rate that matches the flux across the membrane in order to enable complete or near complete withdrawal of the gases without substantial bubble formation.

It is desirable that the advancing contact angle of the porous membrane with the electrolyte is greater than 90°.

In another embodiment the porous membrane is a hydrophobic membrane. Suitable membranes may have various pore sizes and pore shapes and be manufactured from various hydrophobic materials. The membranes may have a pore size less than 0.5 µm, less than 0.1 µm or worse than 0.05 µm.

In another embodiment, the porous membrane may or may not be hydrophobic in nature but be coated with a thin film of hydrophobic material. Suitable hydrophobic material may be rather or silicone and enhance the wet ability of the porous membrane whilst still providing the requisite degree of breathability (having a sufficient flux of the gas across the membrane). Other suitable thin-film coatings may be selected from the group consisting of silicone-fluoropolymer, polydimethylsiloxane (PDMS) or its copolymers, PDD-TFE (perfluoro-2,2-dimethyl-1, 3-dioxole with tetrafluoroethylene) and combinations thereof.

In another embodiment, the porous membrane comprises hydrophobic, conducting carbon material such as carbon fibre, graphene or carbon nanotubules.

The Young-Laplace equation defining the capillary pressure, Pc, can be used as guidance for selection of materials and pore size for the membrane. It states that the capillary pressure ($p_c$) is proportional to the surface tension ($\gamma$) and inversely proportional to the effective radius (r) of the interface, it also depends on the wetting contact angle ($\theta$) of the liquid on the surface of the capillary.

$$p_c = \frac{2\gamma \cos\theta}{r}$$

As the contact angle approach 90° the capillary pressure goes towards zero (and eventually changes sign) resulting in wetting of the membrane. This is theoretically limiting possible membrane materials to those with a contact angle above 90°. Table 1 lists average surface tension and water contact angles for common hydrophobic polymers. It should be taken into account that the production method and material grade can result in some variation in contact angle. For example, for polystyrene contact angles up to 98° has been reported whereas the average is below 90°. It will be apparent to those skilled in the that only the part of the membrane that is in direct contact with water needs to have the needed high contact angle and that this can be obtained for example, by coating one side of a (hydrophilic) membrane with one of the polymers from the list below. Some carbon materials (e.g. carbon fibre) have a contact angle higher than 90° and may therefore be used directly as a conducting hydrophobic membrane. However, adequate catalysts will have to be coated onto these carbon materials.

TABLE 1

| Polymer Name | Surface Tension ($\gamma$) mJ/m$^2$ | Contact Angle |
|---|---|---|
| Polyvinyl fluoride (PVF) | 32.7 | 84.5 |
| Polyvinyl chloride (PVC) | 37.9 | 85.6 |
| Nylon 8,8 | 34 | 86 |
| Nylon 9,9 | 34 | 86 |
| Polystyrene (PS) | 34 | 87.4 |
| Polyvinylidene fluoride (PVDF) | 31.6 | 89 |
| Poly n-butyl methacrylate (PnBMA) | 29.8 | 91 |
| Polytrifluoroethylene | 26.5 | 92 |
| Nylon 10,10 | 32 | 94 |
| Polybutadiene | 29.3 | 96 |
| Polyethylene (PE) | 31.6 | 96 |
| Polychlorotrifluoroethylene (PCTFE) | 30.8 | 99.3 |
| Polypropylene (PP) | 30.5 | 102.1 |
| Polydimethylsiloxane (PDMS) | 20.1 | 107.2 |
| Poly t-butyl methacrylate (PtBMA) | 18.1 | 108.1 |
| Fluorinated ethylene propylene (FEP) | 19.1 | 108.5 |
| Hexatriacontane | 20.6 | 108.5 |
| Paraffin | 24.8 | 108.9 |
| Polytetrafluoroethylene (PTFE) | 19.4 | 109.2 |
| Poly(hexafluoropropylene) | 16.9 | 112 |
| Polyisobutylene (PIB, butyl rubber) | 27 | 112.1 |

For example, with reference to the Young-Laplace equation above, for a polytetrafluoroethytene (PTFE) membrane in contact with liquid water, the contact angles are typically 100-115° (http://www.accudvnetest.com/polymer_surface_data/ptfe.pdf). The surface tension of water is typically 0.07197 N/m at 25° C. (http://en.wikipedia.org/wiki/Surface_tension). If the water contains an electrolyte such as 1 M KOH, then the surface tension of the water typically increases to 0.07480 N/m (according to the scientific paper entitled "Surface tension of aqueous electrolyte solutions at high concentrations—representation and prediction" in *Chemical and Engineering Science*, Volume 56 (2001), pages 2879-2888, by authors Zhibao Li and Benjamin C. Y. Lu). Applying these parameters to the Washburn equation yields the following data:

| Pore size of membrane, micrometers | Contact Angle of the liquid with the membrane, degrees | Pressure to wet/dewet pore, Pa (N/m2) | Pressure to wet/dewet pore, Pa (bar) | Pressure to wet/dewet pore, Pa (psi) |
|---|---|---|---|---|
| 10 | 115 | 6322 | 0.06 | 0.9 |
| 5 | 115 | 12645 | 0.13 | 1.8 |
| 1 | 115 | 63224 | 0.63 | 9.2 |
| 0.5 | 115 | 126447 | 1.26 | 18.3 |
| 0.3 | 115 | 210746 | 2.11 | 30.6 |
| 0.1 | 115 | 632237 | 6.32 | 91.7 |
| 0.05 | 115 | 1264474 | 12.64 | 183.3 |
| 0.025 | 115 | 2528948 | 25.29 | 366.7 |
| 0.013 | 115 | 4863361 | 48.63 | 705.2 |
| 0.01 | 115 | 6322369 | 63.22 | 916.7 |

-continued

| Pore size of membrane, micrometers | Contact Angle of the liquid with the membrane, degrees | Pressure to wet/dewet pore, Pa (N/m2) | Pressure to wet/dewet pore, Pa (bar) | Pressure to wet/dewet pore, Pa (psi) |
|---|---|---|---|---|
| 10 | 100 | 2598 | 0.03 | 0.4 |
| 5 | 100 | 5196 | 0.05 | 0.8 |
| 1 | 100 | 25978 | 0.26 | 3.8 |
| 0.5 | 100 | 51956 | 0.52 | 7.5 |
| 0.3 | 100 | 86593 | 0.87 | 12.6 |
| 0.1 | 100 | 259778 | 2.60 | 37.7 |
| 0.05 | 100 | 519555 | 5.20 | 75.3 |
| 0.025 | 100 | 1039111 | 10.39 | 150.7 |
| 0.013 | 100 | 1998290 | 19.98 | 289.8 |
| 0.01 | 100 | 2597777 | 25.98 | 376.7 |

The calculated capillary pressure of the membranes tested and found to be suitable are ranging from −2500 Pa (Mitex (PTFE)) to −132000 Pa (Celgard 880 (PE)) and thereby underlining the large design freedom for the choice of membranes. The negative sign of the pressure values indicates that the capillary pressure is directed out of the pore and thereby preventing flooding of the membrane. These pressure values corresponds well with measurements obtained from PTFE coated carbon paper membranes ("Capillary pressures in carbon paper gas diffusion layers having hydrophilic and hydrophobic pores" Liang Hao, Ping Cheng, International Journal of Heat and Mass Transfer 55 (2012) 133-139). In an embodiment the capillary pressure of the membrane will be below −5000 Pa. For systems where water is dispersed or dissolved in a hydrophobic electrolytes the considerations regarding capillary pressure will still be valid, but in this case a hydrophilic membrane must be used to avoid solvent penetration into the membrane.

Combining the electrode of the present invention with catalysts and photocatalysts of various types e.g. non-precious metal and metal oxides allows greater scope for fabrication of cost efficient and straightforward water splitting electrolytic devices.

Other aspects and forms are disclosed in the specification and/or defined in the appended claims, forming a part of the description of the invention.

In essence, embodiments of the present invention stem from the realization that a breathable electrode structure can be used to directly separate gases in an electrolytic reaction.

Advantages provided by the water splitting cell and electrodes of the present invention comprise the following:
  efficient removal of gases from the water splitting reaction with concomitant improvement in the efficiency of the system;
  the direct separation of gases negates the need for a separator;
  production of high purity gases;
  reduces the potential for produced hydrogen to be oxidised at the anode and for produced oxygen to be reduced at the cathode;
  provides a more favourable environment for the operation of the catalyst;
  facilitates use of otherwise unsuitable catalysts that would be degraded as partial pressure of $O_2$ increases;
  the direct separation of gases decreases gas cross over and thereby enhances columbic efficiency; and
  the combination of the electrode with optimized catalyzed and photocatalysts provides opportunities for fabrication of more cost efficient electrolytic devices Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus, are not limitative of the disclosure herein, and in which:

FIG. 1b illustrates gas and ion movements in an aqueous electrolyte 11 relative to the cathode 10 and anode 12 corresponding to the set-up shown in FIG. 1a.

EXAMPLES

The invention will be further described with reference to the following non-limiting examples. More specifically, three membrane electrodes with different morphology and pore sizes and shapes were prepared and studied. Platinum, the most well studied catalyst was used as the model catalyst material. However the electrodes of the present invention should not be interpreted as being limited to this catalyst and can be operated with many catalysts.

Membrane Treatment and Pt Coating

PTFE membranes (Goretex®) was obtained from Gore Inc and Mitex™ (10 μm) was obtained from Millipore. Au mylar (2.5 Ohm/square) was purchased from CPFilms Inc. Maleic anhydride was obtained from Sigma-Aldrich. Preparation of the Goretex®, Mitex™; polyethylene (PE) and polypropylene (PP) membranes prior to Pt coating was similar to previous work described by Winther-Jensen et al entitled 'High rates of oxygen reduction over a vapor phase-polymerized PEDOT electrode' in *Science* 2008; 321: 671-4. Maleic anhydride was grafted onto the hydrophobic surface of the membranes to ensure good bonding to the gold conducting layer, using plasma polymerisation as earlier reported in the aforementioned article and by Ademovic Z et al, in and article entitled 'Surface modification of PET films using pulsed AC plasma polymerisation aimed at preventing protein adsorption' in *Plasma Processes. Polym* 2005; 2:53-63. The gold was sputtered onto the plasma treated membranes and its thickness was optimised to give a surface resistance ~5 Ohm/sq. The Pt was then sputtered on top of the gold layer at 28-30 mA for 60 sec. A traditional GDE was also studied for comparison; this was an ionomer free (LT-140EW-30% Pt on Vulcan XC-72, 0.5 mg cm$^{-2}$) from E-TEK and used as supplied. SEM images were obtained using a JEOL 7100F Field Emission Gun Scanning Electron Microscope at 5 kV.

Electrode Assembly

Figure 1A:
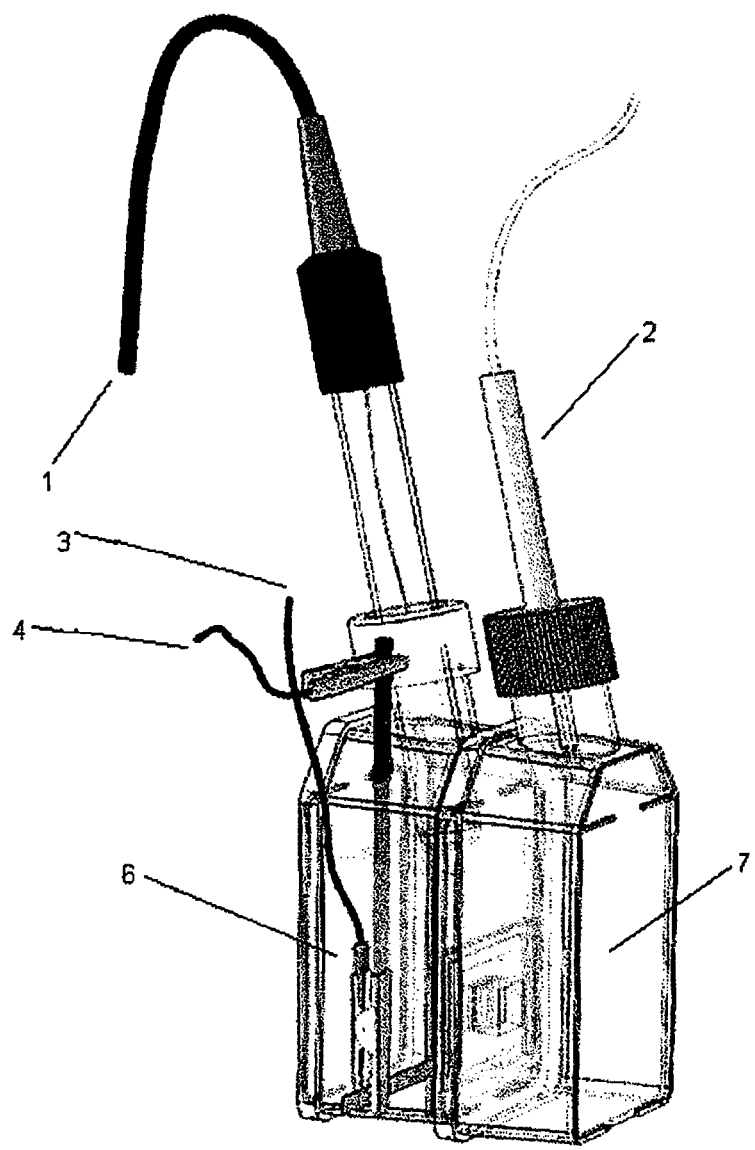
FIG. 1a is a schematic of the experimental set-up showing the reference electrode 1, anode 3, cathode 4, and oxygen probe 5 relative to the electrolysis chamber 6 on the left, attached to the gas collection chamber 7 on the right (half breathing cell)
Figure 1B:
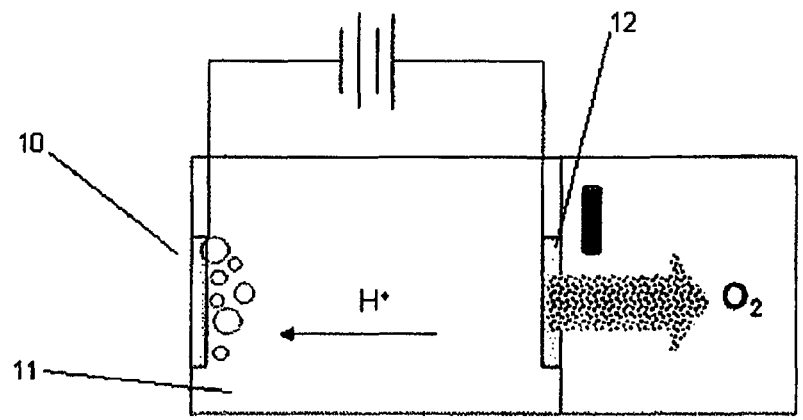
Figure 1C:
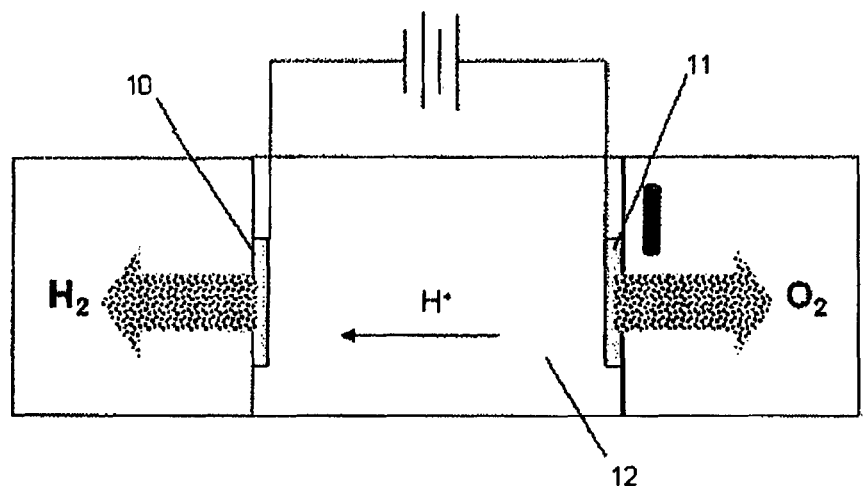
FIG. 1c illustrates gas and ion movements in a full breathing cell. The black rectangles in FIG. 1b and FIG. 1c indicated the Micro-Oxygen Electrode position.

The membrane was sandwiched with a gold strip using a conventional laminator. A 0.7 cm$^2$ window in the laminate allowed access for electrolyte to the Pt coated side of the membrane and for the gas to breathe out to the adjacent chamber when mounted on the test cell with double-sided adhesive tape (FIG. 1).

Experimental Set-Up and Gas Measurement

Sodium p-toluene sulphonate (from Sigma Aldrich) 0.05 M pH 4 was used as an electrolyte. 30 ml of electrolyte was used in the test cell leaving 30 ml gas space above the electrolyte. A three electrode cell was set-up using a saturated calomel reference electrode (SCE) and carbon rod or Pt counter electrode. A multi-channel potentiostat (VMP2 from Princeton Applied Research) was used for the constant-current electrolysis. The distance between the electrodes is 1.5 cm and the potential during operation of all working electrodes was typically ~2-2.4 V vs SCE.

The Micro-Oxygen Electrode was purchased from eDAQ and used to monitor $O_2$ evolution from the electrolysis reactions. It was calibrated at 21% $O_2$ in air and 0% $O_2$ in pure nitrogen gas. The slope from the calibration was 10.3 mV equals 1% $O_2$. The amount of $H_2$ was measured using gas chromatography (SRI 310C, MS-5A column, TCD, Ar carrier).

Results

Figure 2:
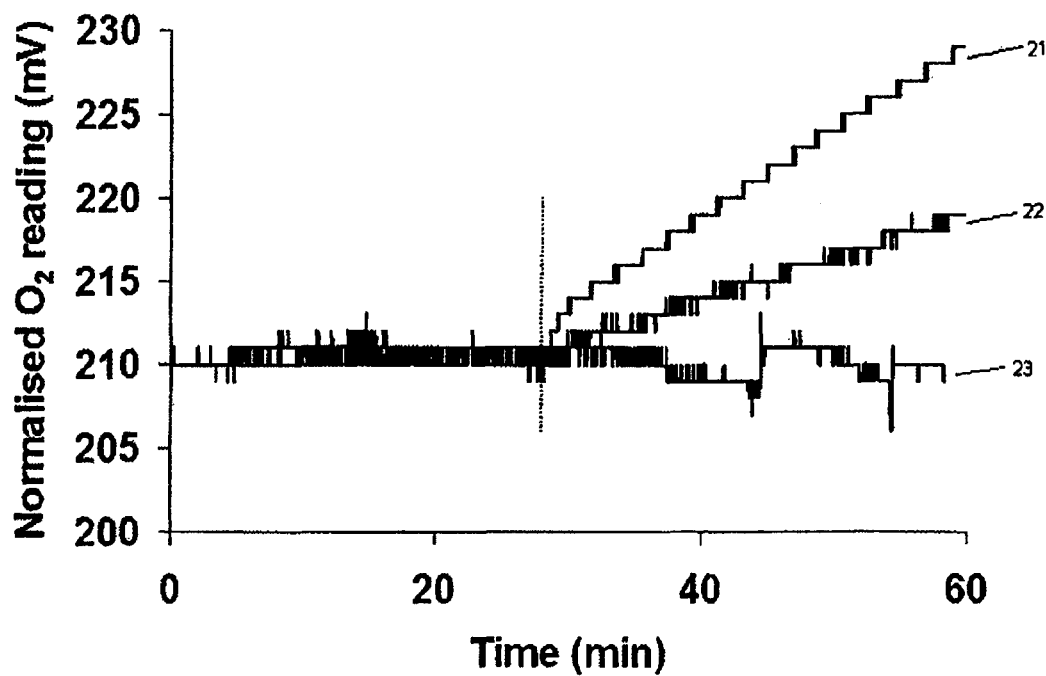
FIG. 2 illustrates $O_2$ measurement behind the different Pt-coated membranes (Au/Goretex® 21, Au/Mitex™ 10 μm 22 and GDE 23)

The test cell was set up as shown in Scheme 1. Firstly, the experiments were focused on WO. Pt coated membrane was used as the anode and the liberated $O_2$ was monitored using a Micro-Oxygen Electrode placed in the chamber (60 ml) on the back side of the membrane (Scheme 1). Several seconds after 10 mA current was applied to the cell, bubbles started to form on the counter electrode (carbon rod). On the anode side, bubbles were not observed on the working area when Goretex® membrane was used. This suggested that the major portion of the $O_2$ was able to escape to the back side of the membrane. Some bubble formation was observed on the working area when the other membranes were used. The $O_2$ content of the back side chamber steadily increased during electrolysis for both Pt-coated Au/Goretex® and Au/Mitex™ electrodes, but remained unchanged for the GDE (FIG. 2), suggesting no $O_2$ production in the latter case. The studies by Chaparro et al (Chaparro A M, Mueller N, Atienza C, Daza L. Study of electrochemical instabilities of PEMFC electrodes in aqueous solution by means of membrane inlet mass spectrometry. *J Electroanal Chem* 2006; 591:69-73) and Jang and Kim (Jang S E, Kim H. Effect of water electrolysis catalysts on carbon corrosion in polymer electrolyte membrane fuel cells. *J Am Chem Soc* 2010; 132:14700-1) support this observation with the GDE as they showed the electrochemical oxidation of carbon on the GDE in presence of water at oxidative potentials (Chaparro A M, Mueller N, Atienza C, Daza L. Study of electrochemical instabilities of PEMFC electrodes in aqueous solution by means of membrane inlet mass spectrometry. *J Electroanal Chem* 2006; 591:69-73; and Jang S E, Kim H. Effect of water electrolysis catalysts on carbon corrosion in polymer electrolyte membrane fuel cells. *J Am Chem Soc* 2010; 132:14700-1).

The $O_2$ evolution rate from the Pt-coated Au/Goretex® electrode was the highest, indicating that the coated Goretex® electrode is the most efficient in emitting gaseous $O_2$ from the WO reaction.

Figure 3:
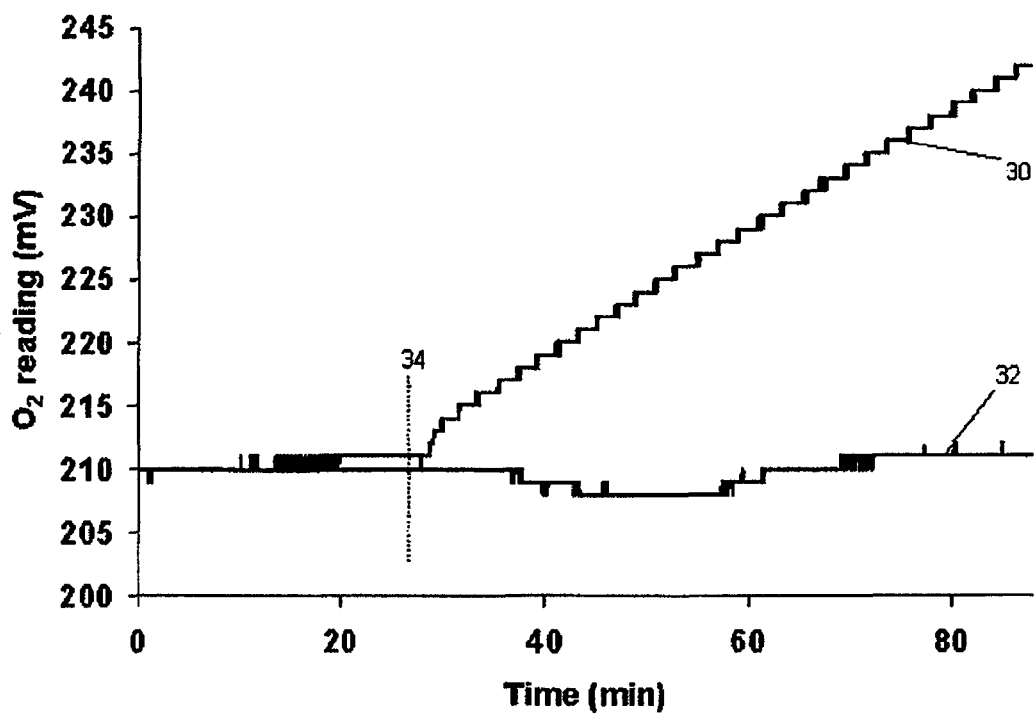
FIG. 3 illustrates $O_2$ measurements above the electrolyte ($O_2$ front 30) and behind the membrane in the adjacent chamber ($O_2$ back 32) after commencement of the application of 10 mA 34.

Further investigation was performed by monitoring the $O_2$ evolution in the head space above the electrolyte, in the front chamber, during water splitting with the Pt-coated Au/Goretex® electrode. The result (FIG. 3) showed no measurable increase in $O_2$ above the electrolyte, indicating a very high efficiency in removing it into the back chamber. The Faradaic efficiency in these experiments was 90±3%.

Figure 4:
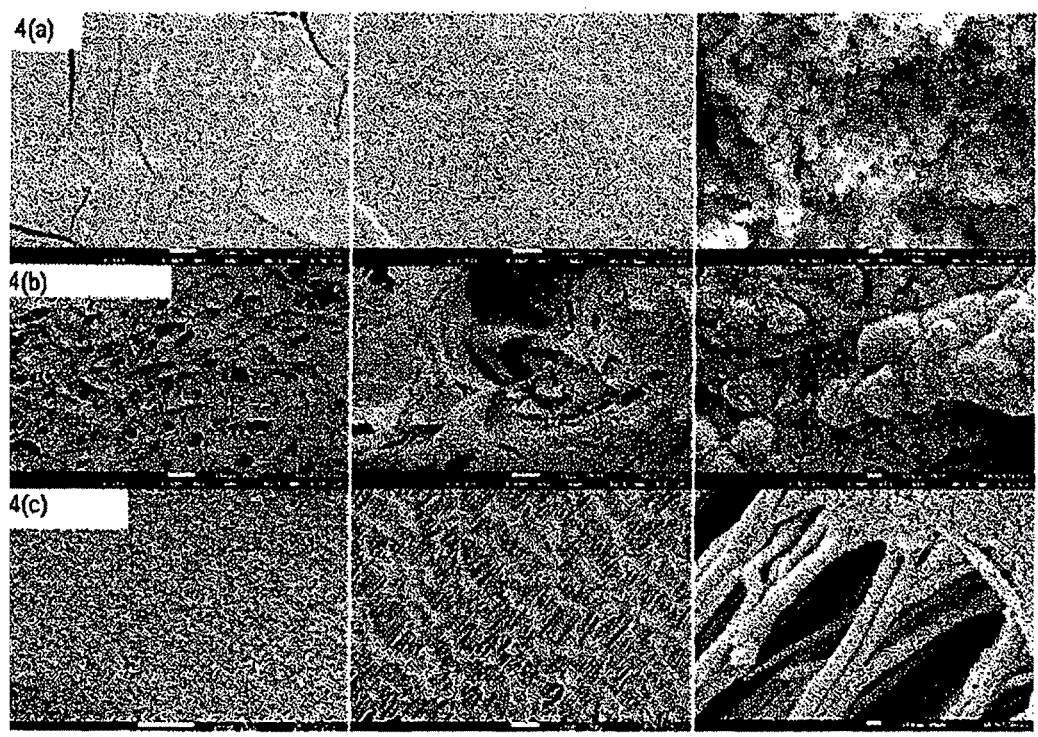
FIG. 4 is a series of scanning electron micrographs (SEM) of Pt-coated Au/Goretex® (FIG. 4(c)), Au/Mitex™ 10 μm (FIG. 4(b)) and GDE (FIG. 4(a)). (Scale bars: left column—100 μm, middle column—10 μm and right column—10 nm).

In order to understand the "breathing" ability of each membrane, scanning electron microscopy was performed as shown in FIG. 4.

As expected, Pt nanoparticles were well distributed on the membrane surfaces. The images of the GDE showed dense, packed structure with Pt nanoparticles ranging from 65 to 100 nm. The size of the sputtered Pt nanoparticles was in the range of 30-40 nm on Mitex™ and Goretex® membranes. The Mitex™ 10 μm images showed inconsistent pore size and distribution, whereas Goretex® has a fine pore size (~1×10 μm) with consistent distribution. The Goretex® structure is believed to contribute to its higher performance observed in the water splitting experiments.

As a control experiment, a non-porous substrate consisting of Pt-coated Au mylar was used as an anode in a single chamber set-up with the oxygen probe placed above the electrolyte. The $O_2$ produced in this experiment was much lower (0.48 μmol/min) than when using the Pt-coated Au/Goretex® (1.35 μmol/min) in the two chambers set-up. The Faradaic efficiency from this control experiment was only 31%. This indicates the degree of oxygen shuttling between the electrodes that are present in this cell configuration, having no separator, when a non-porous electrode is used.

In another experiment the Pt-coated Au mylar was used as the anode and Pt-coated Au/Goretex® as the cathode, ie as the $H_2$ producing electrode. There was no $H_2$ bubble formation observed on the cathode. The Faradaic efficiency of $O_2$ evolution in this experiment was 61%. When Pt-coated Au/Goretex® electrodes were used for both anode and cathode, so that both gases were removed from the cell, the Faradaic efficiency was increased to 92%. $H_2$ detected in this experiment was found to be close to 2:1 stoichiometric ratio within measurement error (±7%). This suggests that in an optimized cell and gas flow configuration it may be practical to avoid the use of a separator in these cells.

Figure 5:
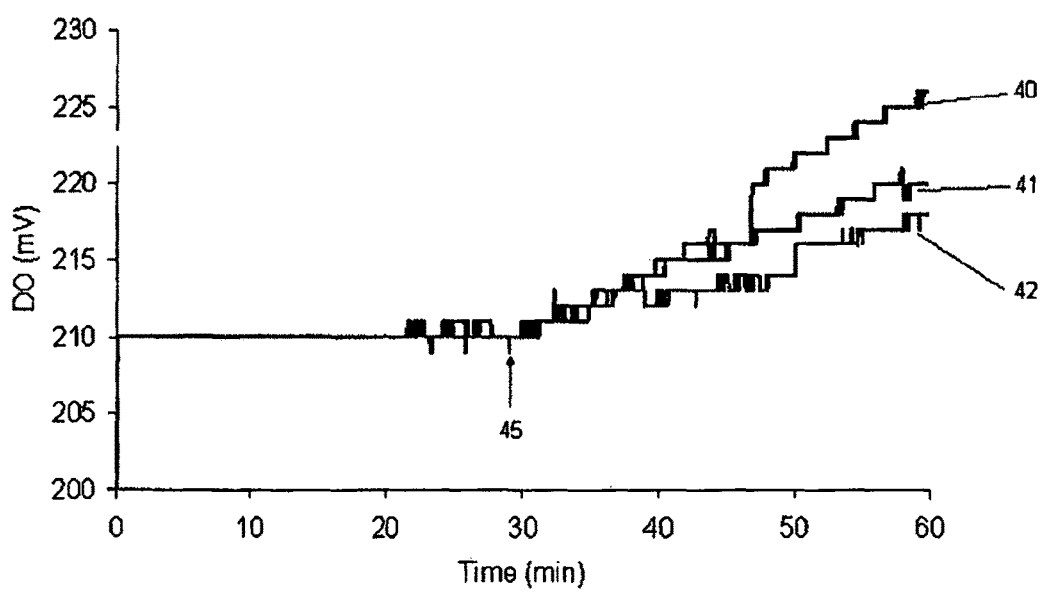
FIG. 5 illustrates $O_2$ measurement behind the different membranes coated with Pt: polyethylene Celgard 880 (40), polypropylene mesh (41) and non-woven polypropylene (42). 10 mA is applied where indicated (45).

Although Goretex® initially was found to be the best among the three membranes tested, certainly there are membranes with different hydrophobicity and various pore sizes and shapes which can be used. A number of these possibilities were tested in an additional experiment. Here polyethylene (PE, Celgard 880 (0.1×1μ poresize)) and polypropylene (PP) mesh (5μ poresize) and PP non-woven (5μ poresize) membranes were tested in similar way as described above (see FIG. 5). The Celgard 880 performed nearly as good as the Goretex® as seen from the increase in oxygen measured on the back chamber of the setup, which correspond to a faradaic efficiency of 82%. The two PP membranes were less efficient (51% and 41% respectively), however clearly showed that this material can be used for the membrane structure.

Stability Test of CdS on Ti/Au/Goretex and Baseline Test Using Ti/Au/Goretex.

Figure 6:
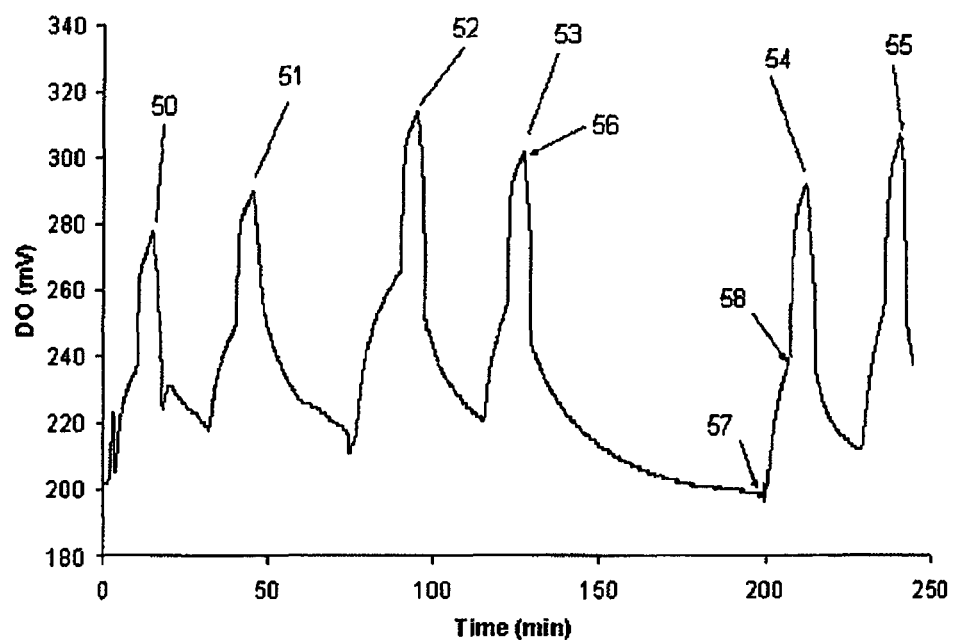
FIG. 6 is a plot of DO (mV) against time (min) illustrating $O_2$ evolution of the back chamber during shining of light and during evacuation using. CdS/Ti/Au/Goretex. The peaks appearing in the graph correspond to 13 min ΔDO 42 mV (50), 13 min ΔDO 40 mV (51), 18 min ΔDO 49 mV (52), 12 min ΔDO 47 mV (53), 12 min ΔDO 52 mV (54) and 12 min ΔDO 53 mV (55). Measurements were taken with light off and $N_2$ and $O_2$ admitted to the chamber (56), with the light on and $N_2$ out (57) then $O_2$ out (58)

CdS/Ti/Au/Goretex or Ti/Au/Goretex (0.5 cm$^2$) was laminated and sandwiched between two plastic bottles. The front chamber was filled up with 0.05 M NaPTS pH 6.75 30 ml. An oxygen sensor was placed in the gas chamber. Black cloth was used to cover the plastic chamber to protect the light directly shining on the DO probe. Asahi lamp was used to shine the light on the sample. Each data point was collected after the following procedure: $N_2$ gas was used to purged the electrolyte for about 15 min or until stable baseline was achieved and in the same time $O_2$ was flushed into the back chamber, immediately after removal of $N_2$ (and the hole was sealed) the light was shone on the sample for 7 min, $O_2$ was then removed (and the hole was sealed) with the light continued to shine for another 5 min. This process has been repeated for 39 cycles. The $O_2$ increased was monitored and typical graph was shown in FIG. 6.

Figure 7:
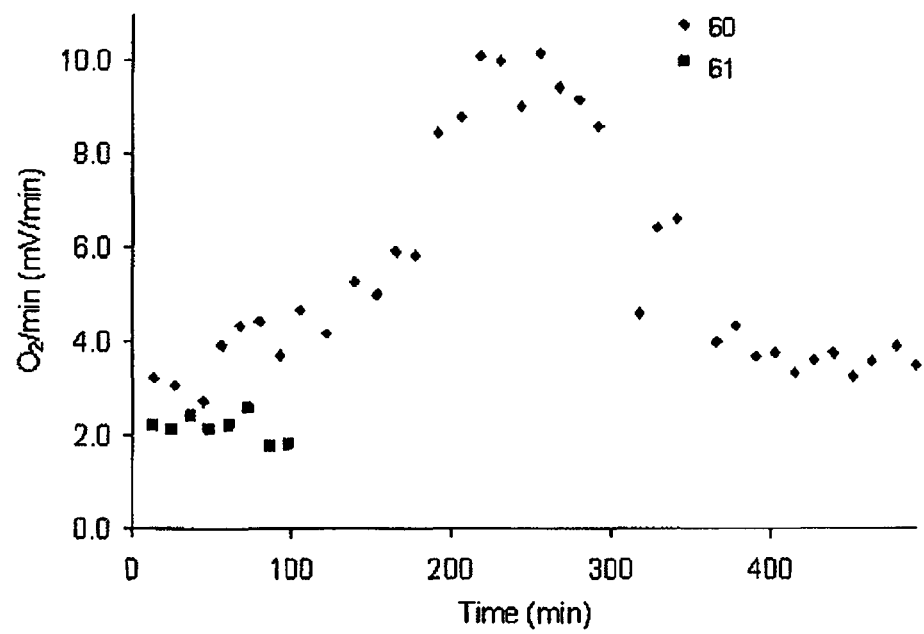
FIG. 7 is a plot of $O_2$ evolution rate over light exposed time (min) for CdS/Ti/Au/Goretex membrane (60) and Ti/Au/Gortex membrane (61).

The data was then plotted as the rate of $O_2$ increased (increased in $O_2$ reading over, typically, 12 min light exposure) versus light exposed time (FIG. 7). From FIG. 7 it can be seen that the $O_2$ evolution rate from CdS/Ti/Au/Goretex electrode was higher than from the Ti/Au/Goretex baseline and stable for more than 8 hours. This result should be compared to the usual degradation of CdS within several minutes under light/oxygen evolution.

The surface treatment, using polyacid and plasma polymerisation, is also a vital step to ensure a good cohesion between the catalyst and the membrane. It also opens the route to deposit the catalyst onto hydrophobic membranes. The possibility of merging this technology with some of the non-precious metal and metal oxide catalysts (Pletcher D, Li X. Prospects for alkaline zero gap water electrolysers for hydrogen production. *Int J Hydrogen Energy* 2011; 36:15089-104) that have limited possible use in PEM electrolysers will lead to a facile and cost efficient water splitting device. It is also possible to use this approach to enhance the lifetime of photo-active electro-catalysts, many of which are sensitive to the presence of oxygen bubbles.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A water splitting cell having at least one electrode comprising a porous membrane that is gas permeable and hydrophobic, wherein gas produced at the at least one electrode diffuses out of the cell via the porous membrane.

2. The water splitting cell according to claim 1, wherein greater than 90% of the gas produced at the at least one electrode is removed from the cell across the porous membrane.

3. The water splitting cell according to claim 1, wherein greater than 95% of the gas produced at the at least one electrode is removed from the cell across the porous membrane.

4. The water splitting cell according to claim 1, wherein greater than 99% of the gas produced at the at least one electrode is removed from the cell across the porous membrane.

5. The water splitting cell according to claim 1, wherein the gas produced is separated from the at least one electrode without bubble formation.

6. The water splitting cell according to claim 1, wherein the gas produced forms bubbles no larger than 125 μm.

7. The water splitting cell according to claim 1, wherein the gas produced forms bubbles no larger than 100 μm.

8. The water splitting cell according to claim 1, wherein the gas produced forms bubbles no larger than 50 μm.

9. The water splitting cell according to claim 1, having a cathode comprising a porous membrane that is gas permeable and hydrophobic, wherein $H_2$ gas produced at the cathode diffuses out of the cell via the porous membrane, separating the $H_2$ gas from the cathodic reaction without bubble formation.

10. The water splitting cell according to claim 1, having an anode comprising a porous membrane that is gas permeable and hydrophobic, wherein $O_2$ gas produced at the anode diffuses out of the cell via the porous membrane, separating the $O_2$ gas from the anodic reaction without bubble formation.

11. The water splitting cell according to claim 1, wherein the porous membrane has a thin-film coating.

12. The water splitting cell according to claim 11, wherein the thin-film coating is hydrophobic.

13. The water splitting cell according to claim 11, wherein the thin-film coating comprises one or more of the following: silicone-fluoropolymer, polydimethylsiloxane (PDMS) or its copolymers with fluoromonomers, PDD-TFE (perfluoro-2, 2-dimethyl-1, 3-dioxole with tetrafluoroethylene), polyvinyl fluoride, polyvinyl chloride, nylon 8,8, nylon 9,9, polystyrene, polyvinylidene fluoride, poly n-butyl methacrylates, polytrifluoroethylene, nylon 10,10, polybutadiene, polyethylene polychlorotrifluoroethylene, polypropylene, polydimethylsiloxane, poly t-butyl methacrylates, fluorinated ethylene propylene, hexatriacontane, paraffin, polytetrafluoroethylene, poly(hexafluoropropylene), polyisobutylene.

14. The water splitting cell according to claim 1, wherein the porous membrane comprises conducting carbon material.

15. The water splitting cell according to claim 1, which further includes a catalyst associated with the porous membrane.

16. The water splitting cell according to claim 15, wherein the catalyst comprises one or more of the following: Pt, Au, Pd, Ru, Ir, Mn, Fe, Ni, Co, $NiO_x$, Mn complexes, Fe complexes, $MoS_x$, CdS, CdSe, GaAs.

17. The water splitting cell according to claim 1, having:
a cathode comprising a first porous membrane that is gas permeable and hydrophobic,
an anode comprising a second porous membrane that is gas permeable and hydrophobic, and
at least one electrolyte for immersion of the cathode and the anode,
wherein gas is produced at the cathode and the anode without bubble formation and diffuses out of the cell via the porous membranes.

18. A method of splitting water with a water splitting cell, the method comprising the steps of:
providing a cathode comprising a first porous membrane that is gas permeable and hydrophobic,
providing an anode comprising a second porous membrane that is gas permeable and hydrophobic,
immersing the cathode and anode in at least one electrolyte, and
passing a current through the anode and the cathode, wherein $O_2$ gas produced at the anode diffuses out of the cell via the second porous membrane, and, wherein $H_2$ gas produced at the cathode diffuses out of the cell via the first porous membrane.

19. A method for generating hydrogen in a water splitting cell, the method comprising:
producing hydrogen gas at a first electrode,
diffusing the hydrogen gas out of the cell via a first porous membrane that is gas permeable and hydrophobic, and
separating the hydrogen gas produced without bubble formation.

20. A method for generating oxygen in a water splitting cell, the method comprising:
producing oxygen gas at a second electrode,
diffusing the oxygen gas out of the cell via a second porous membrane that is gas permeable and hydrophobic, and
separating the oxygen gas produced without bubble formation.

21. The method according to claim 19, wherein more than 90% of the gas is separated at the electrode by transporting the gas across the porous membrane adjacent a catalytic surface.

22. The method according to claim 19, wherein the gas is separated without bubble formation of bubbles larger than 125 µm.

\* \* \* \* \*